United States Patent
Xie et al.

(10) Patent No.: US 12,483,319 B2
(45) Date of Patent: Nov. 25, 2025

(54) ACCESS METHOD AND DEVICE

(71) Applicant: Huawei Technologies Co., Ltd., Shenzhen (CN)

(72) Inventors: Zonghui Xie, Shenzhen (CN); Hong Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 455 days.

(21) Appl. No.: 18/063,360

(22) Filed: Dec. 8, 2022

(65) Prior Publication Data
US 2023/0112163 A1 Apr. 13, 2023

Related U.S. Application Data

(63) Continuation of application No. PCT/CN2021/097513, filed on May 31, 2021.

(30) Foreign Application Priority Data

Jun. 9, 2020 (CN) .......................... 202010517960.0

(51) Int. Cl.
*H04B 7/185* (2006.01)

(52) U.S. Cl.
CPC ....... *H04B 7/18504* (2013.01); *H04B 7/1855* (2013.01)

(58) Field of Classification Search
CPC . H04W 72/23; H04W 72/0446; H04W 72/21; H04W 72/0453; H04W 24/10; H04W 72/04; H04W 72/1268; H04W 72/02; H04W 72/542; H04W 74/006; H04W 72/12; H04W 48/12

See application file for complete search history.

(56) References Cited

U.S. PATENT DOCUMENTS

| | | | |
|---|---|---|---|
| 10,251,075 | B1 | 4/2019 | Panchal |
| 2016/0014807 | A1 | 1/2016 | Ghosh |
| 2017/0347340 | A1 | 11/2017 | Haley et al. |
| 2018/0324815 | A1* | 11/2018 | Nammi ................ H04B 7/0639 |

(Continued)

FOREIGN PATENT DOCUMENTS

| | | |
|---|---|---|
| CN | 103582085 A | 2/2014 |
| CN | 103916977 A | 7/2014 |
| CN | 104602319 A | 5/2015 |

OTHER PUBLICATIONS

Qualcomm Incorporated, "New Work Item: NarrowBand IOT (NB-IOT)," 3GPP TSG RAN Meeting #69, Sep. 14-16, 2015, RP-151621, 9 pages.

(Continued)

*Primary Examiner* — Khalid W Shaheed
(74) *Attorney, Agent, or Firm* — Slater Matsil, LLP

(57) ABSTRACT

Embodiments of this application provide an access method and a device, and relate to the field of communication technologies. A terminal device obtains a transmission parameter between the terminal device and an access network device; and the terminal device accesses the access network device when determining, based on the transmission parameter and reference information, that a preset condition is satisfied. The reference information includes a threshold corresponding to the transmission parameter. Embodiments of this application are used for communication access.

20 Claims, 6 Drawing Sheets

(56) References Cited

U.S. PATENT DOCUMENTS

2020/0021941 A1* 1/2020 Nguyen ............... H04W 4/027

OTHER PUBLICATIONS

Ericsson, "Revised WI: Further LTE Physical Layer Enhancements for MTC," 3GPP TSG RAN Meeting #66, Sep. 9-12, 2014, RP-141865, 9 pages.
MediaTek Inc., "New Study WID on NB-IoT/eTMC support for NTN," 3GPP TSG RAN Meeting #86, Dec. 9-31, 2019, RP-193235, 4 pages.
3GPP TR 38.821 V16.0.0 (Dec. 2019), "3rd Generation Partnership Project; Technical Specification Group Radio Access Network; Solutions for NR to support non-terrestrial networks (NTN) (Release 16)," pp. 1-140.

* cited by examiner

Terminal      Satellite Base                5G CN
                      station

Terminal      Satellite Base       Base        5G CN
                    station-DU  station-CU

ACCESS METHOD AND DEVICE

CROSS-REFERENCE TO RELATED APPLICATIONS

This application is a continuation of International Application No. PCT/CN2021/097513, filed on May 31, 2021, which claims priority to Chinese Patent Application No. 202010517960.0, filed on Jun. 9, 2020. The disclosures of the aforementioned applications are hereby incorporated by reference in their entireties.

TECHNICAL FIELD

Embodiments of this application relate to the field of communication technologies, and in particular, to an access method and a device.

BACKGROUND

In a 5G communication system and a future communication system, a non-terrestrial network (NTN) gradually emerges in the communication field. Communication is performed in the non-terrestrial network through an aircraft such as an airplane, a high-altitude balloon, or a satellite, and the non-terrestrial network has an advantage of wide coverage.

An NTN communication scenario is shown in FIG. 1, and includes a data network, a gateway, an aircraft platform (for example, a satellite or an uncrewed aerial vehicle), and a terminal device. A maximum communication distance between the aircraft platform and the terminal device is far greater than an orbit altitude, and the orbit altitude is generally considered as a minimum communication distance between the aircraft platform and the terminal device. Because there is a large difference between the minimum communication distance and the maximum communication distance between the aircraft platform and the terminal device, when the terminal device communicates with the aircraft platform at the maximum communication distance, the terminal device and the aircraft platform need to use large transmit power, resulting in high power consumption. How to resolve the foregoing problem of high power consumption is a problem that needs to be considered in this field.

SUMMARY

Embodiments of this application provide an access method and a device. A terminal device accesses an access network device only when the terminal device is close to an aircraft platform, to avoid power consumption caused because the terminal device needs to use large transmit power to access the access network device when the terminal device is far from the aircraft platform.

To achieve the foregoing objectives, the following technical solutions are used in embodiments of this application.

According to an aspect, an embodiment of this application provides an access method. The method includes: A terminal device obtains a transmission parameter between the terminal device and an access network device; and the terminal device accesses the access network device when determining, based on the transmission parameter and reference information, that a preset condition is satisfied. The reference information includes a threshold corresponding to the transmission parameter.

In this solution, the terminal device accesses the access network device when determining, based on the transmission parameter and the reference information, that the preset condition is satisfied, instead of accessing the access network device in any case. In this way, the terminal device may access the access network device when an aircraft platform is close to the terminal device. This avoids power consumption caused because the terminal device needs to use large transmit power when a distance between the terminal device and the aircraft platform is large.

In a possible design, the method further includes: The reference information includes one or more of a channel parameter threshold, a Doppler frequency shift threshold, or a distance threshold between the terminal device and the access network device. In this way, whether the terminal device accesses the access network device is determined with reference to the plurality of parameters, so that determining accuracy can be improved.

In a possible design, when the transmission parameter includes a channel parameter, the corresponding reference information includes the channel parameter threshold between the terminal device and the access network device. The preset condition includes: The channel parameter between the terminal device and the access network device is greater than or equal to the channel parameter threshold.

In this solution, that the channel parameter between the terminal device and the access network device is greater than or equal to the channel parameter threshold indicates that signal strength between the terminal device and the access network device is large, that is, the distance between the terminal device and the aircraft platform is small. In this case, the transmit power required by the terminal device to access the access network device is small, and power consumption is low.

In another possible design, the transmission parameter includes a channel parameter. The preset condition includes: An absolute value of a variation of the channel parameter between the terminal device and the access network device in unit time is less than or equal to the channel parameter threshold.

In this solution, that a variation of the channel parameter between the terminal device and the access network device in unit time is less than or equal to the channel parameter threshold indicates that the channel parameter between the terminal device and the access network device changes slowly, that is, the distance between the terminal device and the aircraft platform changes slowly. According to common knowledge in this field, when the aircraft platform is close to the terminal device, the distance between the aircraft platform and the terminal device changes slowly. It can be learned that the distance between the terminal device and the aircraft platform is small. In this case, the transmit power required by the terminal device to access the access network device is small, and power consumption is low.

In still another possible design, the transmission parameter includes a channel parameter, and the channel parameter threshold is 0. The preset condition includes: A variation of the channel parameter between the terminal device and the access network device in unit time is greater than 0.

In this solution, that a variation of the channel parameter between the terminal device and the access network device in unit time is greater than 0 indicates that signal strength between the terminal device and the access network device is increasingly large, that is, the distance between the terminal device and the aircraft platform tends to be smaller. Because the aircraft platform moves fast, when the terminal device determines, based on that the variation of the channel parameter in the unit time is greater than 0, that the distance between the terminal device and the aircraft platform tends to be smaller, the aircraft platform is to move to a location close to the terminal device very soon. Then, when the terminal device accesses the access network device, the aircraft platform may have moved to the location close to the terminal device. In this case, the distance between the terminal device and the aircraft platform is small, the transmit power required by the terminal device to access the access network device is small, and power consumption is low. Therefore, the terminal device accesses the access network device.

For example, the channel parameter includes one or more of RSRP, RSRQ, an SINR, or an SNR.

In a possible design, the transmission parameter includes a Doppler frequency shift, and the Doppler frequency shift threshold is 0. The preset condition includes: The Doppler frequency shift between the terminal device and the access network device is less than 0.

In this solution, that the Doppler frequency shift between the terminal device and the access network device is less than 0 indicates that the distance between the terminal device and the aircraft platform tends to be smaller. Because the aircraft platform moves fast, when the terminal device determines, based on that the Doppler frequency shift between the terminal device and the access network device is less than 0, that the distance between the terminal device and the aircraft platform tends to be smaller, the aircraft platform is to move to a location close to the terminal device very soon. Then, when the terminal device accesses the access network device, the aircraft platform may have moved to the location close to the terminal device. In this case, the distance between the terminal device and the aircraft platform is small, the transmit power required by the terminal device to access the access network device is small, and power consumption is low. Therefore, the terminal device accesses the access network device.

In a possible design, the transmission parameter includes a distance. The preset condition includes: The distance between the terminal device and the access network device is less than or equal to the distance threshold.

In this solution, that the distance between the terminal device and the access network device is less than or equal to the distance threshold indicates that the distance between the terminal device and the aircraft platform is small. In this case, the transmit power required by the terminal device to access the access network device is small, and power consumption is low.

In another possible design, the transmission parameter includes a distance. The preset condition includes: An absolute value of a variation of the distance between the terminal device and the access network device in unit time is less than or equal to the distance threshold.

In this solution, that a variation of the distance between the terminal device and the access network device in unit time is less than or equal to the distance threshold indicates that the distance between the terminal device and the aircraft platform changes slowly. According to common knowledge in this field, when the aircraft platform is close to the terminal device, the distance between the aircraft platform and the terminal device changes slowly. It can be learned that the distance between the terminal device and the aircraft platform is small. In this case, the transmit power required by the terminal device to access the access network device is small, and power consumption is low.

In still another possible design, the transmission parameter includes a distance, and the distance threshold is 0. The preset condition includes: A variation of the distance between the terminal device and the access network device is less than 0.

In this solution, that a variation of the distance between the terminal device and the access network device is less than 0 indicates that the distance between the terminal device and the aircraft platform tends to be smaller. In this case, when the terminal device determines, based on that the variation of the distance between the terminal device and the access network device is less than 0, that the distance between the terminal device and the aircraft platform tends to be smaller, the aircraft platform is to move to a location close to the terminal device very soon. Then, when the terminal device accesses the access network device, the aircraft platform may have moved to the location close to the terminal device. In this case, the distance between the terminal device and the aircraft platform is small. When the terminal device accesses the access network device, the required transmit power is small, and power consumption is low. Therefore, the terminal device accesses the access network device.

In a possible design, the method further includes: When determining, based on the transmission parameter and the reference information, that the preset condition is not satisfied, the terminal device periodically determines, based on the reference information, whether to access the access network device.

In a possible design, the transmission parameter further includes an uplink data volume. The preset condition further includes: The uplink data volume of the terminal device is less than or equal to a data volume threshold. The method further includes: If the terminal device determines that the uplink data volume is greater than the data volume threshold, the terminal device accesses the access network device.

In this solution, when the uplink data volume of the terminal device is small, the terminal device accesses the access network device when the terminal device is close to the aircraft platform. This avoids power consumption caused because the terminal device needs to use large transmit power to access the access network device when the terminal device is far from the aircraft platform. When the uplink data volume of the terminal device is large, the terminal device directly accesses the access network device, to avoid power consumption and complexity caused by changing the aircraft platform in a transmission process.

In a possible design, that the terminal device determines to access the access network device includes at least one of the following: The terminal device determines to send a random access preamble to the access network device; the terminal device determines to initiate a random access procedure to the access network device; the terminal device determines to send uplink transmission data to the access network device; and an access stratum of the terminal device indicates a non-access stratum to perform uplink transmission.

In a possible design, the method further includes: The terminal device receives first capability indication information from the access network device. The first capability indication information indicates the terminal device to access the access network device based on the transmission parameter and the reference information.

In another possible design, the method further includes: The terminal device receives second capability indication information from the access network device. The second capability indication information indicates the terminal device to access the access network device based on the transmission parameter and the reference information when the terminal device performs a first service. That the terminal device accesses the access network device when determining, based on the transmission parameter and reference information, that a preset condition is satisfied includes: The terminal device accesses the access network device based on the transmission parameter and the reference information when performing the first service.

In this solution, the terminal device can determine, by receiving the first capability indication information or the second capability indication information, that the terminal device has a capability of accessing a network by using the method in this embodiment of this application.

In a possible design, the method includes: The terminal device receives the reference information from the access network device. In other words, the reference information may be configured by the access network device. In addition, the reference information may alternatively be preset information in the terminal device.

According to another aspect, an embodiment of this application provides an access method. The method includes: An access network device sends capability indication information to a terminal device. The capability indication information includes first capability indication information or second capability indication information. The first indication information indicates the terminal device to access the access network device based on a transmission parameter and reference information. The second capability indication information indicates the terminal device to access the access network device based on the transmission parameter and the reference information when the terminal device performs a first service. The access network device sends the reference information to the terminal device. The reference information includes a reference value of the transmission parameter between the access network device and the terminal device.

According to another aspect, this application provides a communication apparatus, including a transceiver module and a processing module. The transceiver module is configured to obtain a transmission parameter between the communication apparatus and an access network device. The processing module is configured to access the access network device when determining, based on the transmission parameter and reference information, that a preset condition is satisfied. The reference information includes a threshold corresponding to the transmission parameter.

In a possible design, the reference information includes one or more of a channel parameter threshold, a Doppler frequency shift threshold, or a distance threshold between the communication apparatus and the access network device.

In a possible design, the transmission parameter includes a channel parameter. The preset condition includes: The channel parameter is greater than or equal to the channel parameter threshold.

In another possible design, the transmission parameter includes a channel parameter. The preset condition includes: An absolute value of a variation of the channel parameter in unit time is less than or equal to the channel parameter threshold.

In still another possible design, the transmission parameter includes a channel parameter, and the channel parameter threshold is 0. The preset condition includes: A variation of the channel parameter in unit time is greater than 0.

In a possible design, the transmission parameter includes a Doppler frequency shift, and the Doppler frequency shift threshold is 0. The preset condition includes: The Doppler frequency shift is less than 0.

In a possible design, the transmission parameter includes a distance. The preset condition includes: The distance is less than or equal to the distance threshold.

In another possible design, the transmission parameter includes a distance. The preset condition includes: A variation of the distance in unit time is less than or equal to the distance threshold.

In still another possible design, the transmission parameter includes a distance, and the distance threshold is 0. The preset condition includes: A variation of the distance is less than 0.

In a possible design, the processing module is further configured to: when determining, based on the transmission parameter and the reference information, that the preset condition is not satisfied, periodically determine, based on the reference information, whether to access the access network device.

In a possible design, the transmission parameter further includes an uplink data volume. The preset condition further includes: The uplink data volume is less than or equal to a data volume threshold.

In a possible design, the processing module is further configured to: if determining that the uplink data volume is greater than the data volume threshold, access the access network device.

In a possible design, the transceiver module is further configured to receive first capability indication information from the access network device. The first capability indication information indicates the communication apparatus to access the access network device based on the transmission parameter and the reference information.

In another possible design, the transceiver module is further configured to receive second capability indication information from the access network device. The second capability indication information indicates the communication apparatus to access the access network device based on the transmission parameter and the reference information when the communication apparatus performs a first service. The processing module is further configured to access the access network device based on the transmission parameter and the reference information when performing the first service.

In a possible design, the transceiver module is further configured to receive the reference information from the access network device.

According to another aspect, this application provides a communication apparatus, including a transceiver module and a processing module. The processing module is configured to send capability indication information to a terminal device by using the transceiver module. The capability indication information includes first capability indication information or second indication information. The first capability indication information indicates the terminal device to access the communication apparatus based on a transmission parameter and reference information. The second capability indication information indicates the terminal device to access the communication apparatus based on the transmission parameter and the reference information when the terminal device performs a first service. The processing module is further configured to send the reference information to the terminal device by using the transceiver module. The reference information includes a reference value of the transmission parameter between the communication apparatus and the terminal device.

According to still another aspect, this application provides a communication apparatus, including a processor and a memory. The memory is configured to store computer instructions, and when the processor executes the instructions, the communication apparatus is enabled to perform the method in any possible design of any one of the foregoing aspects.

According to still another aspect, an embodiment of this application provides a communication system. The communication system may include a terminal device and an access network device. Each device in the communication system may perform the method in any possible design of any one of the foregoing aspects.

Any apparatus, computer storage medium, computer program product, chip, or communication system provided above is configured to perform the corresponding method provided above. Therefore, for beneficial effects that can be achieved, refer to the beneficial effects of the corresponding solution in the corresponding method provided above. Details are not described herein again.

These or other aspects of this application are more concise and easier to understand in the description of the following embodiments.

DETAILED DESCRIPTION OF ILLUSTRATIVE EMBODIMENTS

Figure 1:
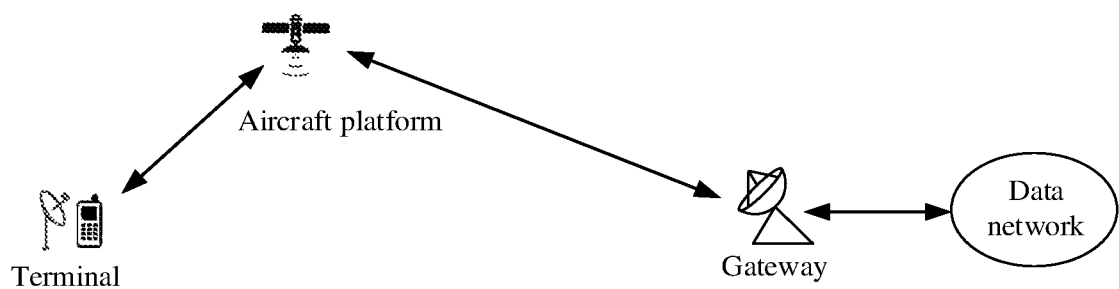
FIG. 1 is a schematic diagram of an NTN communication system according to an embodiment of this application.

The following describes the technical solutions in embodiments of this application with reference to the accompanying drawings in embodiments of this application. It is clear that the described embodiments are merely a part but not all of embodiments of the present invention.

In description in embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in embodiments of this application, "a plurality of" means two or more.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of embodiments, unless otherwise stated, "a plurality of" means two or more than two.

An access method provided in embodiments of this application may be applied to a communication system. The communication system may include devices such as a data network, a gateway, an access network device, and a terminal device.

The terminal device is an entity that is on a user side and that is configured to receive a signal, send a signal, or receive and send a signal. The terminal device may also be referred to as user equipment (UE), a terminal, an access terminal device, a subscriber unit, a subscriber station, a mobile station, a remote station, a remote terminal device, a mobile device, a user terminal device, a wireless communication device, a user agent, or a user apparatus. The terminal device may be an electricity meter, a water meter, or the like. The terminal device may alternatively be a V2X device, for example, a smart car (smart car or intelligent car), a digital car (digital car), an unmanned car (unmanned car, driverless car, pilotless car, or automobile), a self-driving car (self-driving car or autonomous car), a pure electric vehicle (pure EV or Battery EV), a hybrid electric vehicle (HEV), a range extended electric vehicle (range extended EV, REEV), a plug-in hybrid electric vehicle (plug-in HEV, PHEV), a new energy vehicle (new energy vehicle), or a road side unit (road site unit, RSU). The terminal device may alternatively be a B2C device, a B2B device, or the like. In addition, the terminal device in embodiments of this application may alternatively be a mobile station (MS), a subscriber unit, an uncrewed aerial vehicle, an internet of things (IoT) device, a station (ST) in a WLAN, a cellular phone, a smartphone, a cordless phone, a wireless data card, a tablet computer, a session initiation protocol (SIP) phone, a wireless local loop (WLL) station, a personal digital processing (PDA) device, a laptop computer, an AR device, a VR device, or a machine type communication (MTC) terminal device. The terminal device may alternatively be a handheld device or a computing device that has a wireless communication function, another processing device connected to a wireless modem, a vehicle-mounted device, a wearable device, or the like.

The access network (RAN) device is a device that provides a wireless communication function for the terminal device. For example, the access network device includes but is not limited to a next-generation gNodeB (gNodeB, gNB) in 5G, an evolved NodeB (eNB), a radio network controller (RNC), a NodeB (NB), a base station controller (BSC), a base transceiver station (BTS), a home base station (for example, home evolved NodeB, or home NodeB, HNB), a baseband unit (BBU), a transmission reception point (TRP), a transmission point (TP), a mobile switching center, and the like.

Figure 2:
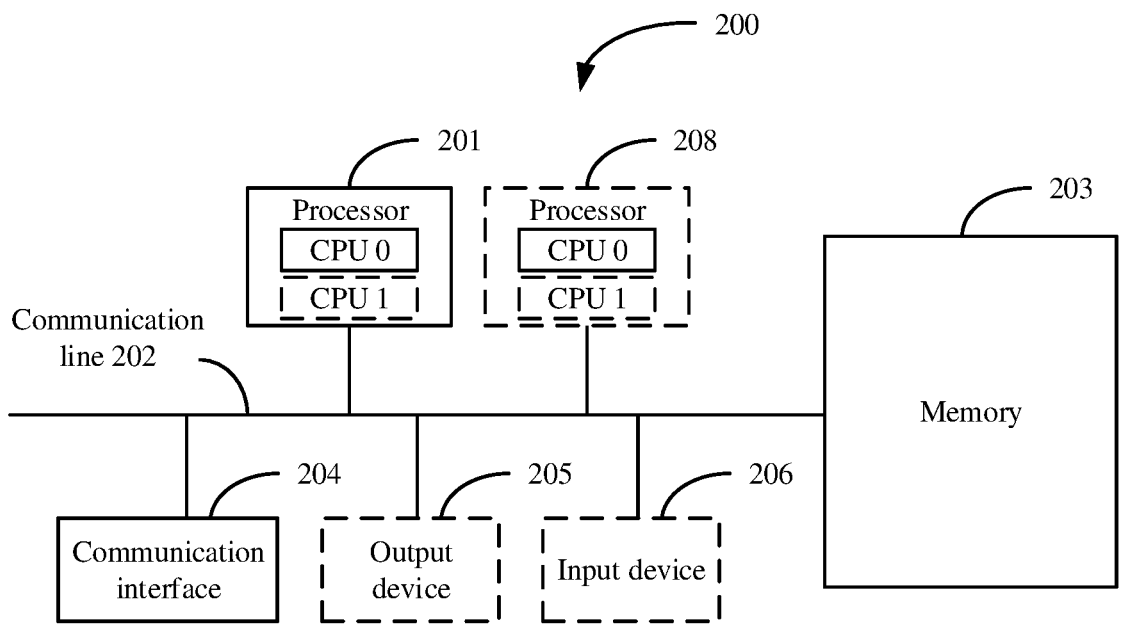
FIG. 2 is a schematic diagram of a hardware structure of a communication apparatus according to an embodiment of this application.

For example, FIG. 2 is a schematic diagram of a hardware structure of a communication apparatus according to an embodiment of this application. The communication apparatus 200 includes a processor 201, a communication line 202, a memory 203, and at least one communication interface (where descriptions are provided in FIG. 2 merely by using an example in which a communication interface 204 is included).

The processor 201 may be a general-purpose central processing unit (CPU), a microprocessor, an application-specific integrated circuit (ASIC), or one or more integrated circuits configured to control execution of programs in the solutions in this application.

The communication line 202 may include a path on which information is transferred between the foregoing components.

The communication interface 204 is any apparatus such as a transceiver, and is configured to communicate with another device or a communication network such as the Ethernet, a radio access network (radio access network, RAN), or a wireless local area network (wireless local area network, WLAN).

The memory 203 may be a read-only memory (ROM) or another type of static storage device that can store static information and instructions, or a random access memory (RAM) or another type of dynamic storage device that can store information and instructions. The memory 203 may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), or magnetic disk storage medium or another magnetic storage device, or any other medium that can be used to carry or store expected program code in a form of instructions or a data structure and that is accessible to a computer, but is not limited thereto. The memory may exist independently, and is connected to the processor through the communication line 202. The memory may alternatively be integrated with the processor.

The memory 203 is configured to store computer-executable instructions for executing the solutions in this application, and the processor 201 controls the execution. The processor 201 is configured to execute the computer-executable instructions stored in the memory 203, to implement an access method provided in the following embodiments of this application.

Optionally, the computer-executable instructions in this embodiment of this application may also be referred to as application program code. This is not specifically limited in this embodiment of this application.

During specific implementation, in an embodiment, the processor 201 may include one or more CPUs, for example, a CPU 0 and a CPU 1 in FIG. 2.

During specific implementation, in an embodiment, the communication apparatus 200 may include a plurality of processors, for example, the processor 201 and a processor 208 in FIG. 2. Each of the processors may be a single-core (single-CPU) processor, or may be a multi-core (multi-CPU) processor. The processor herein may be one or more devices, circuits, and/or processing cores configured to process data (for example, computer program instructions).

During specific implementation, in an embodiment, the communication apparatus 200 may further include an output device 205 and an input device 206. The output device 205 communicates with the processor 201, and may display information in a plurality of manners. For example, the output device 205 may be a liquid crystal display (LCD), a light emitting diode (LED) display device, a cathode ray tube (CRT) display device, or a projector. The input device 206 communicates with the processor 201, and may receive an input from a user in a plurality of manners. For example, the input device 206 may be a mouse, a keyboard, a touchscreen device, or a sensor device.

The foregoing communication apparatus 200 may be a general-purpose device or a special-purpose device. During specific implementation, the communication apparatus 200 may be a desktop computer, a portable computer, a network server, a palmtop computer (PDA), a mobile phone, a tablet computer, a wireless terminal device, an embedded device, or a device having a structure similar to that in FIG. 2. A type of the communication apparatus 200 is not limited in this embodiment of this application.

In some embodiments, a communication distance between an access network device and a terminal device may be variable. For example, the communication system may be the NTN communication system shown in FIG. 1. The NTN communication system may further include an aircraft platform.

The aircraft platform may be an aircraft such as a satellite or an uncrewed aerial vehicle. The aircraft platform may be connected to the access network device, to provide, for the terminal device, a transmission reception point (TRP) for wireless access. Alternatively, the access network device may be carried on the aircraft platform, so that the terminal device communicates with a core network by using the access network device. Alternatively, the access network device may be carried on the aircraft platform in a distributed manner based on a distributed unit (DU).

The following describes three communication architectures of the NTN communication system by using an example in which the aircraft platform is a satellite and the access network device is a base station.

Figure 3A:
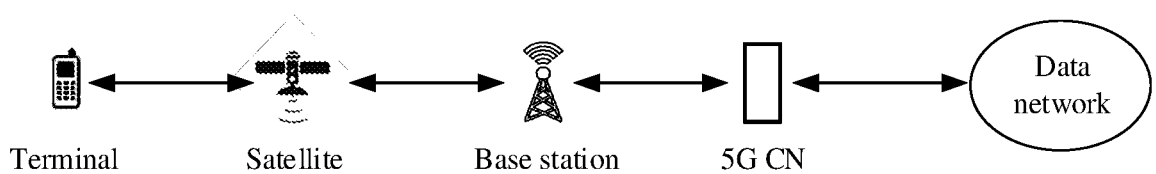
FIG. 3A is a schematic diagram of a communication architecture based on transparent transmission of an aircraft platform according to an embodiment of this application.

If the satellite is connected to the base station, and provides, for the terminal device, a transmission reception point for wireless access, the NTN communication system may be a communication architecture shown in FIG. 3A. In the communication architecture that is based on satellite transparent transmission and that is shown in FIG. 3A, the satellite is connected to the base station. The base station may be disposed on the ground, and the base station communicates with the terminal device by using the satellite to forward a signal.

Figure 3B:
FIG. 3B is a schematic diagram of a communication architecture of an access network device based on an aircraft platform according to an embodiment of this application.

If the base station is carried on the satellite, the NTN communication system may be a communication architecture shown in FIG. 3B. In the communication architecture that is based on a satellite base station and that is shown in FIG. 3B, the base station is carried on the satellite. Therefore, the base station and the satellite move synchronously, and the base station and the satellite can be considered as a whole.

Figure 3C:
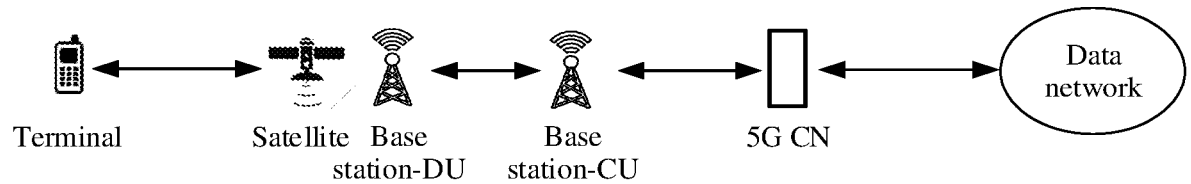
FIG. 3C is a schematic diagram of a communication architecture based on a distributed unit aircraft platform according to an embodiment of this application.

In addition, if the base station is arranged based on a distributed unit, the NTN communication system may be a communication architecture shown in FIG. 3C. In the communication architecture that is based on a distributed unit satellite and that is shown in FIG. 3C, a base station part is carried on the satellite based on a distributed unit. The communication mechanism in FIG. 3C may be considered as a special case of the communication architecture shown in FIG. 3B.

The access method in embodiments of this application may be applied to the foregoing communication architectures. The aircraft platform may include a low-earth orbit satellite, a medium-earth orbit satellite, a geosynchronous orbit satellite, an unmanned flight system platform, and a high-earth orbit satellite based on an altitude of the aircraft platform. Table 1 shows altitude ranges, orbits, and coverage corresponding to the foregoing different platform types.

TABLE 1

| Platform | Altitude range (km) | Orbit | Typical coverage (km) |
|---|---|---|---|
| Low-earth orbit satellite | 300 to 1500 | Sub-circular orbit around the earth | 100 to 1000 |
| Medium-earth orbit satellite | 7000 to 25,000 | | 100 to 1000 |
| Geosynchronous orbit satellite | 35,786 | Geosynchronous orbit | 200 to 3500 |
| Unmanned flight system platform | 8 to 50 | | 5 to 200 |
| Highly elliptical orbit satellite | 400 to 50,000 | Elliptical orbit around the earth | 200 to 3500 |

Based on the different orbit types of the aircraft platform, it can be learned, based on communication parameters that are of a geosynchronous orbit-based NTN and a low-earth orbit-based NTN and that are shown in Table 2, that a maximum communication distance between the aircraft platform and the terminal device is far greater than a minimum communication distance.

TABLE 2

| Scenario | Geosynchronous orbit-based NTN | Low-earth orbit-based NTN |
|---|---|---|
| Orbit altitude | 35,786 km | 600 km<br>1200 km |
| Maximum communication distance between the satellite and the terminal device | 40,581 km | 1932 km (600 km altitude)<br>3131 km (1200 km altitude) |
| Maximum round-trip delay | A: 541.46 ms<br>B: 270.73 ms | C: 25.77 ms (600 km),<br>41.77 ms (1200 km)<br>D: 12.89 ms (600 km),<br>20.89 ms (1200 km) |

In a conventional technology, because there is a large difference between the maximum communication distance and the minimum communication distance between the terminal device and the aircraft platform, when the terminal device communicates with the aircraft platform at the maximum communication distance, large transmit power needs to be used, resulting in high power consumption.

To reduce the power consumption, in the access method in embodiments of this application, when a distance between the terminal device and the aircraft platform is large, because large transmit power is required for communication, the terminal device does not access the access network device. The terminal device accesses the access network device only when the terminal device detects that the distance between the terminal device and the aircraft platform is small and a preset condition in the access method in embodiments of this application is satisfied. In this way, the terminal device accesses the access network device only when the terminal device is close to the aircraft platform, to avoid power consumption caused because the terminal device needs to use large transmit power to access the access network device when the terminal device is far from the aircraft platform.

Figure 4:
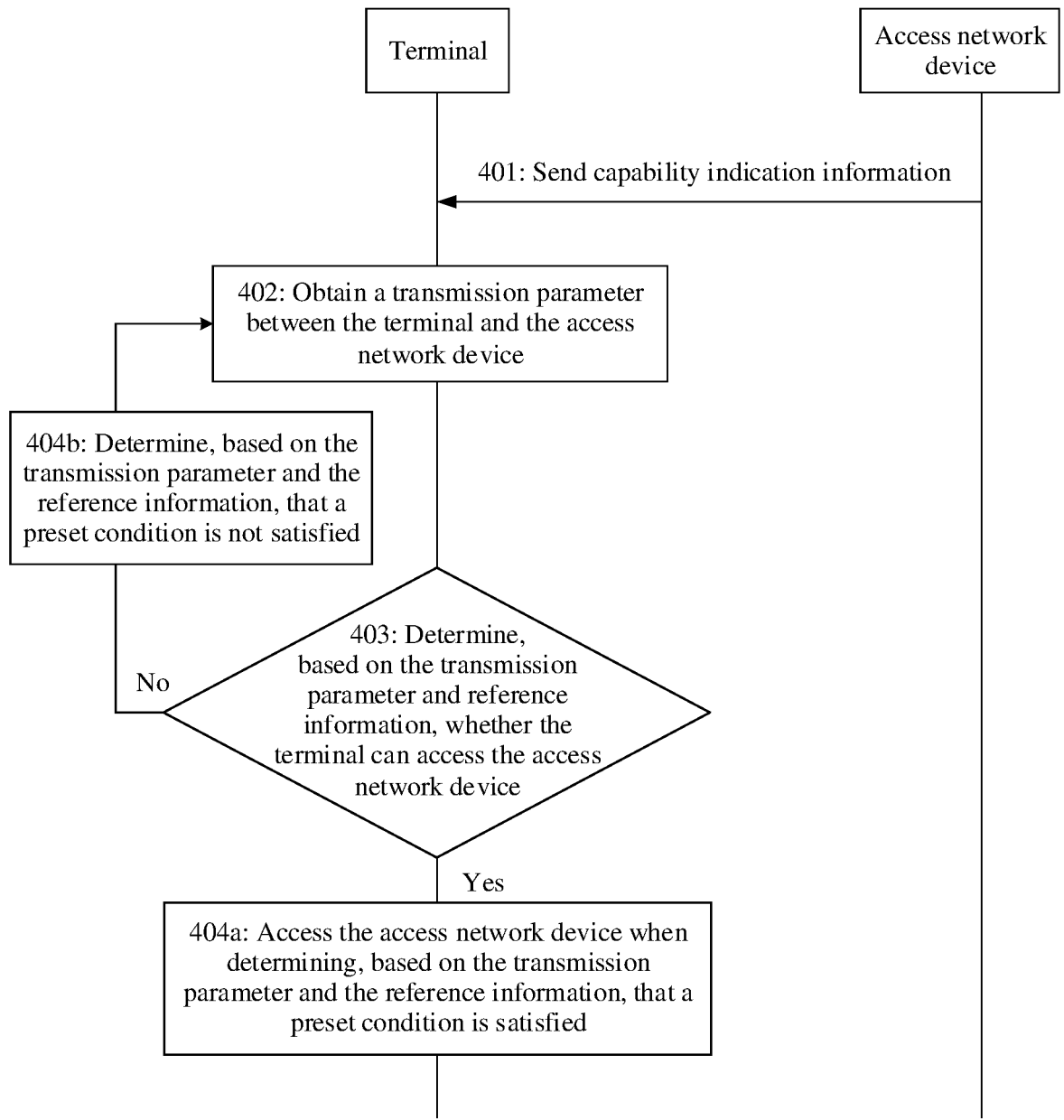
FIG. 4 is a flowchart of a low power consumption access method according to an embodiment of this application.

For example, FIG. 4 shows a low power consumption access method according to an embodiment of this application. The access method may include the following steps.

401: An access network device sends capability indication information to a terminal device.

For example, the access network device may be a gNB in an NTN, or may be another access network device. This is not particularly limited herein.

The capability indication information may be either of the following capability indication information:

first capability indication information, which may also be referred to as explicit indication information, where the first capability indication information indicates the terminal device to access the access network device based on a transmission parameter between the terminal device and the access network device and reference information; in other words, when the capability indication information is the first capability indication information, the terminal device may determine that the terminal device is capable of accessing the access network device by using the method described in the following process in this embodiment of this application; and second capability indication information, which may also be referred to as implicit indication information, where the second capability indication information indicates the terminal device to access the access network device based on a transmission parameter between the terminal device and the access network device and reference information when the terminal device performs a first service, and the first service is a delay tolerable service; in other words, when the capability indication information is the second capability indication information, when the terminal device performs the first service, for example, the delay tolerable service, the terminal device accesses the access network device by using the method described in the following process in this embodiment of this application.

Correspondingly, the terminal device receives the capability indication information from the access network device.

It should be noted that an objective of step 401 is to indicate that the terminal device has a capability of determining, based on the transmission parameter and the reference information, whether to access the access network device by using the access method in this embodiment of this application.

An occasion on which the access network device sends the capability indication information to the terminal device is not limited in this embodiment of this application. For example, step 401 may be performed only once before the terminal device accesses the access network device. After it is determined that the terminal device has the capability of determining, based on the transmission parameter and the reference information, whether to access the access network device by using the access method in this embodiment of this application, the terminal device does not need to repeat the foregoing step when accessing the access network device again. Alternatively, step 401 may be performed each time before the terminal device accesses the access network device.

In addition, in this embodiment of this application, step 401 is optional. In other words, that the access network device sends the capability indication information to the terminal device is not a necessary step in the access method in this embodiment of this application.

402: The terminal device obtains the transmission parameter between the terminal device and the access network device.

For example, the transmission parameter may include at least one of a channel parameter between the terminal device and the access network device, a Doppler frequency shift between the terminal device and the access network device, or a distance between the terminal device and the access network device.

In this embodiment of this application, the channel parameter may include at least one of reference signal received power (RSRP), reference signal received quality (RSRQ), a signal-to-interference-plus-noise ratio (SINR), a signal-to-noise ratio (SNR), or the like.

It may be understood that if the transmission parameter is the channel parameter, a larger value of the channel parameter indicates higher signal strength between the terminal device and the access network device, in other words, a smaller communication distance between the terminal device and the access network device. On the contrary, a smaller value of the channel parameter indicates lower signal strength between the terminal device and the access network device, in other words, a larger communication distance between the terminal device and the access network device. If the transmission parameter is the Doppler frequency shift, when the Doppler frequency shift is less than 0, it indicates that the communication distance between the terminal device and the access network device tends to be smaller. On the contrary, when the Doppler frequency shift is greater than or equal to 0, it indicates that the communication distance between the terminal device and the access network device tends to be larger.

Optionally, the terminal device may obtain the transmission parameter from the access network device. For example, the terminal device may obtain the transmission parameter by measuring a reference signal sent by the access network device. The reference signal may include at least one of the following: a cell-specific reference signal (CRS), a synchronization signal block (SSB), and a channel state reference signal (CSI-RS). Alternatively, the terminal device may obtain the transmission parameter based on system information sent by the access network device. A specific manner of obtaining the transmission parameter by the terminal device is not limited in this embodiment of this application.

403: The terminal device determines, based on the transmission parameter and the reference information, whether the terminal device can access the access network device. Then, the terminal device performs step 404a or step 404b.

Optionally, the terminal device may periodically determine, based on the transmission parameter and the reference information, whether the terminal device can access the access network device.

The reference information includes a threshold of the transmission parameter. In this embodiment of this application, the terminal device may obtain the reference information in a plurality of manners.

Optionally, the reference information may be reference information sent by the access network device to the terminal device. For example, the reference information sent by the access network to the terminal device may correspond to the transmission parameter. The reference information includes at least one of a channel parameter threshold between the terminal device and the access network device, a Doppler frequency shift threshold between the terminal device and the access network device, or a distance threshold between the terminal device and the access network device.

Optionally, the reference information may alternatively be preset information of the terminal device. The preset information may be manually set, or agreed on in a protocol. In this embodiment of this application, a manner of setting the preset information of the terminal device is not limited.

It should be noted that the channel parameter threshold may be a threshold of a value of the channel parameter, or may be a threshold of a variation of the channel parameter. The distance threshold may be a threshold of a distance value, or may be a threshold of a variation of the distance. Generally, the Doppler frequency shift threshold is 0.

404a: The terminal device accesses the access network device when determining, based on the transmission parameter and the reference information, that a preset condition is satisfied.

Specifically, that the terminal device accesses the access network device when determining that a preset condition is satisfied includes at least one of the following: The terminal device determines that the terminal device can send a random access preamble to the access network device; the terminal device determines that the terminal device can initiate a random access procedure to the access network device; the terminal device determines that the terminal device can send uplink transmission to the access network device; and an access stratum of the terminal device indicates, to a non-access stratum, that uplink transmission can be performed. In other words, the terminal device may specifically trigger the procedures to access the access network device.

It can be learned from the foregoing content that the transmission parameter may include at least one of the channel parameter between the terminal device and the access network device, the Doppler frequency shift between the terminal device and the access network device, the distance between the terminal device and the access network device, or the like. Correspondingly, the reference information may include at least one of the channel parameter threshold between the terminal device and the access network device, the Doppler frequency shift threshold between the terminal device and the access network device, or the distance threshold between the terminal device and the access network device. When the transmission parameters are different, preset conditions are also different. The following further describes preset conditions corresponding to the foregoing three types of reference information.

Solution 1

When the transmission parameter is the channel parameter between the terminal device and the access network device, the corresponding reference information is the channel parameter threshold between the terminal device and the access network device. In this case, the preset condition includes at least one of the following:

(1) The channel parameter between the terminal device and the access network device is greater than or equal to the channel parameter threshold.

(2) A variation of the channel parameter between the terminal device and the access network device in unit time is greater than 0, where the channel parameter threshold is 0.

(3) An absolute value of a variation of the channel parameter between the terminal device and the access network device in unit time is less than or equal to the channel parameter threshold.

Figure 5:
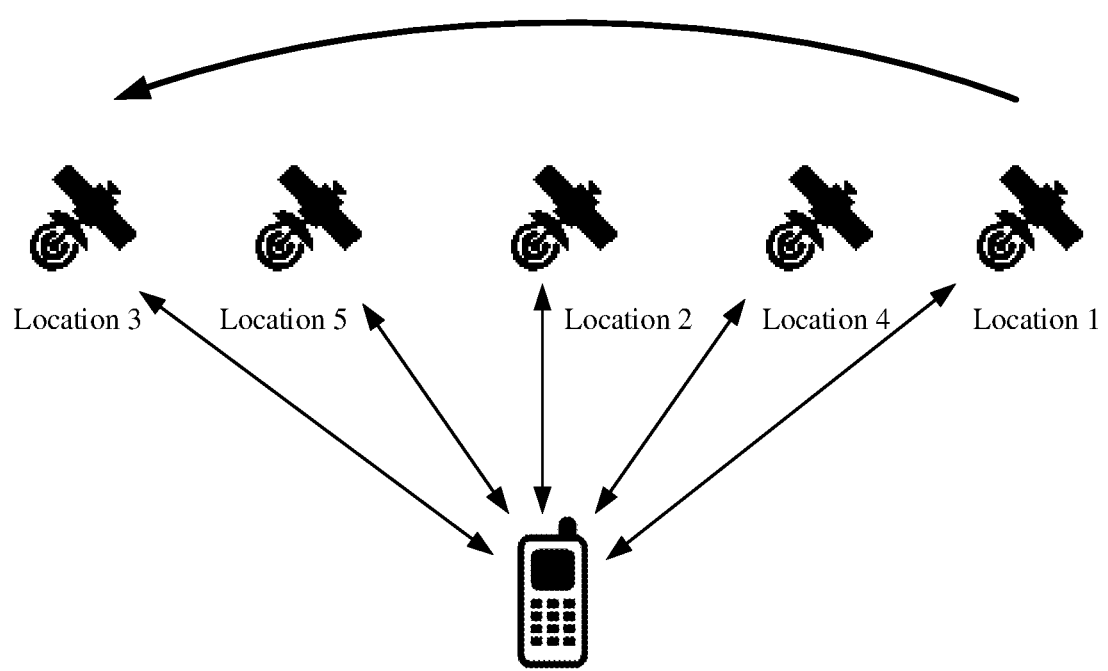
FIG. 5 is a schematic diagram in which a gNB moves with an aircraft platform according to an embodiment of this application.

With reference to FIG. 5, the following provides detailed descriptions by using an example in which the terminal device is UE and the access network device is a gNB. In FIG. 5, the communication architecture shown in FIG. 3B is used as an example. The gNB moves from a location 1 to a location 3 with the aircraft platform through a location 2.

For example, it is assumed that the preset condition is that the channel parameter between the terminal device and the access network device is greater than or equal to the channel parameter threshold.

Refer to FIG. 5. When the gNB moves to the location 1 with the aircraft platform, the channel parameter is M1. When the gNB moves to the location 2 with the aircraft platform, the channel parameter is M2. When the gNB moves to the location 3 with the aircraft platform, the channel parameter is M3. M2 is greater than the channel parameter threshold, and both M1 and M3 are less than the channel parameter threshold.

In a process in which the gNB moves from the location 1 to the location 3 with the aircraft platform through the location 2, when the gNB is at the location 1, M1 is less than the channel parameter threshold, and the preset condition is not satisfied. Therefore, the UE does not access the gNB. Specifically, because that M1 is less than the channel parameter threshold indicates that signal strength between the UE and the gNB is low, it can be learned that a distance between the UE and the gNB is large. However, when the distance between the UE and the gNB is large, transmit power used by the UE to access the gNB is large, and power consumption is high. Therefore, to reduce the power consumption, the terminal device does not access the gNB at the location 1.

When the gNB is at the location 2, M2 is greater than the channel parameter threshold, and the preset condition is satisfied. Therefore, the UE accesses the gNB. Specifically, because that M2 is greater than the channel parameter threshold indicates that signal strength between the UE and the gNB is high, it can be learned that a distance between the UE and the gNB is small. However, when the distance between the UE and the gNB is small, transmit power used by the UE to access the gNB is small, and power consumption is low. Therefore, the terminal device accesses the gNB at the location 2.

Similarly, when the gNB is at the location 3, M3 is less than the channel parameter threshold, and the preset condition is not satisfied. Therefore, the UE does not access the gNB.

In another embodiment, the foregoing method may alternatively be applied to the communication architecture shown in FIG. 3A. In the communication architecture, the aircraft platform has a forwarding function. If the terminal device determines, at a location, that the channel parameter between the terminal device and the access network device is greater than or equal to the channel parameter threshold, it indicates that a signal between the terminal device and the access network device is strong. In this scenario, the aircraft platform transparently transmits the signal between the terminal device and the access network device, and the terminal device determines the transmission parameter based on the signal transparently transmitted from the aircraft platform. Therefore, if the terminal device determines that the signal transparently transmitted by the aircraft platform is strong, a distance between the aircraft platform and the terminal device is small. It can be learned that the distance between the terminal device and the aircraft platform is small at the location. In this case, transmit power used by the terminal device to access the access network device is small, and power consumption is low. Therefore, the terminal device accesses the access network device at the location. On the contrary, if the terminal device determines, at a location, that the channel parameter between the terminal device and the access network device is less than the channel parameter threshold, it may be learned that the distance between the terminal device and the aircraft platform is large. In this case, transmit power used by the terminal device to access the access network device is large, and power consumption is high. Therefore, the terminal device does not access the access network device at the location.

For example, it is assumed that the preset condition is that the variation of the channel parameter between the terminal device and the access network device in the unit time is greater than 0, where the channel parameter threshold is 0. The variation of the channel parameter indicates the variation of the channel parameter in the unit time.

Refer to FIG. 5. The communication architecture shown in FIG. 3B is used as an example. When the gNB moves from the location 1 to a location 4 with the aircraft platform, the UE determines that the variation of the channel parameter in the unit time is greater than 0. In this case, the preset condition is satisfied, and the UE accesses the gNB. Specifically, that the variation of the channel parameter in the unit time is greater than 0 indicates that the value of the channel parameter tends to be larger, and the signal strength tends to be higher. In other words, the distance between the UE and the gNB tends to be smaller. Because the aircraft platform moves very fast, it may be considered that when the UE determines, based on that the variation of the channel parameter in the unit time is greater than 0, that the distance between the UE and the gNB tends to be smaller, the gNB may move to a location close to the terminal device with the aircraft platform very soon. Then, when the UE accesses the access network device, the gNB may have moved to the location close to the UE with the aircraft platform. In this case, the distance between the UE and the gNB is small, the transmit power required by the UE to access the gNB is small, and the power consumption is low. Therefore, the UE accesses the gNB.

On the contrary, refer to FIG. 5. When the gNB moves from the location 2 to a location 5 with the aircraft platform, the UE determines that the variation of the channel parameter in the unit time is less than 0. In this case, the preset condition is not satisfied. Therefore, the UE does not access the gNB. Specifically, that the variation of the channel parameter in the unit time is less than or equal to 0 indicates that the value of the channel parameter does not tend to be larger, and the signal strength does not tend to be higher. For example, if the UE determines that the variation of the channel parameter in the unit time is less than 0, it indicates that the distance between the UE and the gNB tends to be larger. Because the aircraft platform moves very fast, it may be considered that after the UE determines, based on that the variation of the channel parameter in the unit time is less than 0, that the distance between the UE and the gNB tends to be larger, when the UE accesses the access network device, the gNB has moved to a location far from the UE with the aircraft platform. In this case, the distance between the UE and the gNB is large, the transmit power required by the UE to access the gNB is large, and the power consumption is high. Therefore, the UE does not access the gNB.

In another embodiment, the foregoing method may alternatively be applied to the communication architecture shown in FIG. 3A. In the communication architecture, the aircraft platform has the forwarding function. If the terminal device determines, at a location, that the variation of the channel parameter between the terminal device and the access network device in the unit time is greater than 0, it indicates that the signal strength between the terminal device and the access network device tends to be higher. In this scenario, the aircraft platform transparently transmits the signal between the terminal device and the access network device, and the terminal device determines the transmission parameter based on the signal transparently transmitted from the aircraft platform. Therefore, if the terminal device determines that the signal transparently transmitted by the aircraft platform is strong, the distance between the aircraft platform and the terminal device is small. It can be learned that the distance between the terminal device and the aircraft platform tends to be smaller at the location. Because the aircraft platform moves very fast, it may be considered that when the terminal device determines, based on that the variation of the channel parameter in the unit time is greater than 0, that the distance between the terminal device and the aircraft platform tends to be smaller, the aircraft platform may move to a location close to the terminal device very soon. In this case, the transmit power used by the terminal device to access the access network device is small, and the power consumption is low. Therefore, the terminal device accesses the access network device at the location. On the contrary, if the terminal device determines, at a location, that the variation of the channel parameter between the terminal device and the access network device in the unit time is less than or equal to 0, the transmit power used by the terminal device to access the access network device is large, and the power consumption is high. Therefore, the terminal device does not access the access network device at the location.

For example, it is assumed that the preset condition is that the absolute value of the variation of the channel parameter between the terminal device and the access network device in the unit time is less than or equal to the channel parameter threshold. It is assumed that the UE is located in coverage of the aircraft platform, and a location of the UE at a moment is used as a reference point. According to common knowledge in this field, when the aircraft platform is far from the reference point, a distance between the aircraft platform and the reference point changes fast. When the aircraft platform is close to the reference point, a distance between the aircraft platform and the reference point changes slowly. In other words, when the aircraft platform is far from the UE, the distance between the aircraft platform and the UE changes fast. When the aircraft platform is close to the UE, the distance between the aircraft platform and the UE changes slowly.

Refer to FIG. 5. The communication architecture shown in FIG. 3B is used as an example. In the process in which the gNB moves from the location 1 to the location 3 with the aircraft platform through the location 2, when the gNB moves to the location 2 with the aircraft platform, the UE determines that the absolute value of the variation of the channel parameter in the unit time is less than or equal to the channel parameter threshold. In this case, the preset condition is satisfied, and the UE accesses the gNB. Specifically, that the absolute value of the variation of the channel parameter in the unit time is less than or equal to the channel parameter threshold indicates that the channel parameter changes slowly in this case. In other words, the distance between the UE and the gNB on the aircraft platform changes slowly. In other words, the distance between the UE and the aircraft platform is stable. It can be inferred according to the common knowledge that the aircraft platform is close to the UE in this case. In other words, the distance between the UE and the gNB on the aircraft platform is small. When the distance between the UE and the gNB is small, the transmit power required by the UE to access the gNB is small, and the power consumption is low. Therefore, the UE accesses the gNB.

On the contrary, when the gNB moves to the location 1 or the location 3 with the aircraft platform, the UE determines that the absolute value of the variation of the channel parameter in the unit time is greater than the channel parameter threshold. In this case, the preset condition is not satisfied, and the UE does not access the gNB. Specifically, that the variation of the channel parameter in the unit time is greater than the channel parameter threshold indicates that the channel parameter changes fast in this case. In other words, the distance between the UE and the gNB on the aircraft platform changes fast. In other words, the distance between the UE and the aircraft platform is unstable. It can be inferred according to the common knowledge that the aircraft platform is far from the UE in this case. In other words, the distance between the UE and the gNB on the aircraft platform is large. When the distance between the UE and the gNB is large, the transmit power required by the UE to access the gNB is large, and the power consumption is high. Therefore, the UE does not access the gNB.

In another embodiment, the foregoing method may alternatively be applied to the communication architecture shown in FIG. 3A. In the communication architecture, the aircraft platform has the forwarding function. If the terminal device determines, at a location, that the absolute value of the variation of the channel parameter between the terminal device and the access network device in the unit time is less than or equal to the channel parameter threshold, it indicates that the signal strength between the terminal device and the access network device changes slowly. In this scenario, the aircraft platform transparently transmits the signal between the terminal device and the access network device, and the terminal device determines the transmission parameter based on the signal transparently transmitted from the aircraft platform. Therefore, if the terminal device determines that the signal transparently transmitted by the aircraft platform is strong, the distance between the aircraft platform and the terminal device is small. It can be learned that the distance between the terminal device and the aircraft platform changes slowly and is stable at the location. It can be inferred according to the common knowledge that the aircraft platform is close to the terminal device in this case. In this case, the transmit power used by the terminal device to access the access network device is small, and the power consumption is low. Therefore, the terminal device accesses the access network device at the location. On the contrary, if the terminal device determines, at a location, that the absolute value of the variation of the channel parameter between the terminal device and the access network device in the unit time is greater than the channel parameter threshold, the transmit power used by the terminal device to access the access network device is large, and the power consumption is high. Therefore, the terminal device does not access the access network device at the location.

In Solution 1, the terminal device determines, based on the channel parameter, whether to perform access. If the preset condition includes at least one of the following: the channel parameter between the terminal device and the access network device is greater than or equal to the channel parameter threshold; the variation of the channel parameter between the terminal device and the access network device in the unit time is greater than 0, where the channel parameter threshold is 0; or the absolute value of the variation of the channel parameter between the terminal device and the access network device in the unit time is less than or equal to the channel parameter threshold, it indicates that the distance between the terminal device and the aircraft platform is small. When the distance between the terminal device and the aircraft platform is small, the terminal device accesses the access network device. In this way, power consumption caused because the terminal device needs to use large transmit power to access the access network device when the terminal device is far from the aircraft platform is avoided.

Optionally, the preset condition may include any two or three of the foregoing three preset conditions.

For example, when the preset condition includes a combination of the preset condition (1) and the preset condition (2), the terminal device accesses the access network device when the channel parameter between the terminal device and the access network device is greater than or equal to the channel parameter threshold and the variation of the channel parameter between the terminal device and the access network device in the unit time is greater than 0. This is because when both the preset condition (1) and the preset condition (2) are satisfied, it indicates that the distance between the terminal device and the aircraft platform is small, and the distance between the terminal device and the aircraft platform tends to be smaller. In this way, when the distance between the terminal device and the aircraft platform is small, the terminal device accesses the access network device, so that the power consumption can be effectively reduced.

In addition, the preset condition may include a combination of the preset condition (1) and the preset condition (3), or may further include a combination of the preset condition (1), the preset condition (2), and the preset condition (3). A combination of the plurality of preset conditions may further prove that the terminal device accesses the access network device only when the terminal device is close to the aircraft platform, so that the power consumption is effectively reduced, and the power consumption caused because the terminal device needs to use large transmit power to access the access network device when the terminal device is far from the aircraft platform is avoided.

Solution 2

When the transmission parameter is the Doppler frequency shift between the terminal device and the access network device, the corresponding reference information is the Doppler frequency shift threshold between the terminal device and the access network device. In this case, the preset condition includes that the Doppler frequency shift between the terminal device and the access network device is less than 0, where the Doppler frequency shift threshold is0.

The following provides detailed descriptions by using an example in which the terminal device is UE and the access network device is a gNB.

For example, it is assumed that the preset condition is that the Doppler frequency shift between the terminal device and the access network device is less than 0, where the Doppler frequency shift threshold is 0.

Refer to FIG. 5. The communication architecture shown in FIG. 3B is used as an example. When the gNB moves from the location 1 to the location 4 with the aircraft platform, the UE determines that the Doppler frequency shift F<0 at the location 4. When the gNB moves from the location 2 to the location 5, the UE determines that the Doppler frequency shift F>0 at the location 5. According to the common knowledge in this field, F<0 indicates that a relative distance between the UE and the gNB tends to be smaller, and F>0 indicates that the relative distance between the UE and the gNB tends to be larger.

Therefore, when the gNB moves to the location 4 with the aircraft platform, if the UE determines that F<0, the preset condition is satisfied, and the UE accesses the gNB. Specifically, F<0 indicates that the relative distance between the UE and the gNB tends to be smaller. Because the aircraft platform moves very fast, when the UE accesses the access network device, the gNB may have moved to a location close to the UE with the aircraft platform. In this case, the distance between the UE and the gNB is small, the transmit power required by the UE to access the gNB is small, and the power consumption is low. Therefore, the UE accesses the gNB.

On the contrary, when the gNB moves to the location 5 with the aircraft platform, if the UE determines that F>0, the preset condition is not satisfied, and the UE does not access the gNB. Specifically, F>0 indicates that the relative distance between the UE and the gNB tends to be larger. Because the aircraft platform moves very fast, when the UE accesses the access network device, the gNB may have moved to a location far from the UE with the aircraft platform. In this case, the distance between the UE and the gNB is large, the transmit power required by the UE to access the gNB is large, and the power consumption is high. Therefore, the UE does not access the gNB.

In another embodiment, the foregoing method may alternatively be applied to the communication architecture shown in FIG. 3A. In the communication architecture, the aircraft platform has a forwarding function, and the access network device is disposed on the ground. Therefore, in this scenario, the Doppler frequency shift between the terminal device and the access network device is actually a Doppler frequency shift between the terminal device and the aircraft platform. If the terminal device determines, at a location, that the Doppler frequency shift between the terminal device and the access network device is less than 0, it indicates that the distance between the terminal device and the aircraft platform tends to be smaller at the location. Because the aircraft platform moves very fast, it may be considered that when the terminal device accesses the access network device, the aircraft platform may move to a location close to the terminal device very soon. In this case, the transmit power used by the terminal device to access the access network device is small, and the power consumption is low. Therefore, the terminal device accesses the access network device at the location. On the contrary, if the terminal device determines, at a location, that the Doppler frequency shift between the terminal device and the access network device is greater than 0, the transmit power used by the terminal device to access the access network device is large, and the power consumption is high. Therefore, the terminal device does not access the access network device at the location.

In Solution 2, the terminal device determines, based on the Doppler frequency shift, whether to perform access. When the Doppler frequency shift between the terminal device and the access network device is less than 0, it indicates that the distance between the terminal device and the aircraft platform is small. In this case, the terminal device accesses the access network device. In this way, power consumption caused because the terminal device needs to use large transmit power to access the access network device when the terminal device is far from the aircraft platform is avoided.

Solution 3

When the transmission parameter is the distance between the terminal device and the access network device, the corresponding reference information is the distance threshold between the terminal device and the access network device. In this case, the preset condition includes at least one of the following:

(1) The distance between the terminal device and the access network device is less than or equal to the distance threshold.

(2) A variation of the distance between the terminal device and the access network device in unit time is less than 0, where the distance threshold is 0.

(3) An absolute value of a variation of the distance between the terminal device and the access network device in unit time is less than or equal to the distance threshold.

The following provides detailed descriptions by using an example in which the terminal device is UE and the access network device is a gNB.

For example, it is assumed that the preset condition is that the distance between the terminal device and the access network device is less than or equal to the distance threshold.

Refer to FIG. 5. The communication architecture shown in FIG. 3B is used as an example. When the gNB moves to the location 1 with the aircraft platform, a communication distance between the UE and the gNB is L1. When the gNB moves to the location 2 with the aircraft platform, a communication distance between the UE and the gNB is L2. When the gNB moves to the location 3 with the aircraft platform, a communication distance between the UE and the gNB is L3. L2 is less than the distance threshold, and both L1 and L3 are greater than the distance threshold.

In a process in which the gNB moves from the location 1 to the location 3 with the aircraft platform through the location 2, when the gNB is at the location 1, L1 is greater than the distance threshold, and the preset condition is not satisfied. Therefore, the UE does not access the gNB. Specifically, that L1 is greater than the distance threshold indicates that the distance between the UE and the gNB is large in this case. However, when the distance between the UE and the gNB is large, transmit power used by the UE to access the gNB is large, and power consumption is high. Therefore, to reduce the power consumption, the terminal device does not access the gNB at the location 1.

When the gNB is at the location 2, L2 is less than the distance threshold, and the preset condition is satisfied. Therefore, the UE accesses the gNB. Specifically, that L2 is less than the distance threshold indicates that the distance between the UE and the gNB is small in this case. However, when the distance between the UE and the gNB is small, the transmit power used by the UE to access the gNB is small, and the power consumption is low. Therefore, the UE accesses the gNB at the location 2.

Similarly, when the gNB is at the location 3, L3 is greater than the distance threshold, and the preset condition is not satisfied. Therefore, the UE does not access the gNB.

In another embodiment, the foregoing method may alternatively be applied to the communication architecture shown in FIG. 3A. In the communication architecture, the aircraft platform has the forwarding function. The distance may be a communication distance between the terminal device and the access network device, or may be a communication distance between the terminal device and the aircraft platform. For example, if the terminal device determines, at a location, that the distance between the terminal device and the access network device is less than or equal to the distance threshold, it indicates that a signal between the terminal device and the access network device is strong. In this scenario, the aircraft platform transparently transmits the signal between the terminal device and the access network device, and the terminal device determines the transmission parameter based on the signal transparently transmitted from the aircraft platform. Therefore, if the terminal device determines that the signal transparently transmitted by the aircraft platform is strong, the distance between the aircraft platform and the terminal device is small. It can be learned that the distance between the terminal device and the aircraft platform is small at the location. In this case, the transmit power used by the terminal device to access the access network device is small, and the power consumption is low. Therefore, the terminal device accesses the access network device at the location. On the contrary, if the terminal device determines, at a location, that the distance between the terminal device and the access network device is less than the distance threshold, it may be learned that the distance between the terminal device and the aircraft platform is large. In this case, the transmit power used by the terminal device to access the access network device is large, and the power consumption is high. Therefore, the terminal device does not access the access network device at the location.

For example, it is assumed that the preset condition is that the variation of the distance between the terminal device and the access network device in the unit time is less than 0, where the distance threshold is 0. The variation of the distance indicates the variation of the distance in the unit time.

Refer to FIG. 5. The communication architecture shown in FIG. 3B is used as an example. When the gNB moves to the location 4 with the aircraft platform, the UE determines that the variation of the distance in the unit time is less than 0, the preset condition is satisfied, and the UE accesses the gNB. Specifically, that the variation of the distance in the unit time is less than 0 indicates that the distance between the UE and the gNB tends to be smaller. Because the aircraft platform moves very fast, it may be considered that after the UE determines, based on that the variation of the distance in the unit time is less than 0, that the distance between the UE and the gNB tends to be smaller, when the UE accesses the access network device, the gNB may have moved to a location close to the UE with the aircraft platform. In this case, the distance between the UE and the gNB is small, the transmit power required by the UE to access the gNB is small, and the power consumption is low. Therefore, the UE accesses the gNB.

On the contrary, when the gNB moves from the location 2 to the location 5 with the aircraft platform, the UE determines that the variation of the distance in the unit time is greater than 0, and the preset condition is not satisfied. Therefore, the UE does not access the gNB. Specifically, that the variation of the distance in the unit time is greater than or equal to 0 indicates that the distance between the UE and the gNB does not tend to be smaller. For example, if the variation of the distance in the unit time is greater than 0, it indicates that the distance between the UE and the gNB tends to be larger. Because the aircraft platform moves very fast, it may be considered that after the UE determines, based on that the variation of the distance in the unit time is greater than 0, that the distance between the UE and the gNB tends to be larger, when the UE accesses the access network device, the gNB may have moved to a location far from the UE with the aircraft platform. In this case, the distance between the UE and the gNB is large, the transmit power required by the UE to access the gNB is large, and the power consumption is high. Therefore, the UE does not access the gNB.

In another embodiment, the foregoing method may alternatively be applied to the communication architecture shown in FIG. 3A. In the communication architecture, the aircraft platform has the forwarding function. The distance may be a communication distance between the terminal device and the access network device, or may be a communication distance between the terminal device and the aircraft platform. For example, if the terminal device determines, at a location, that the variation of the distance between the terminal device and the access network device in the unit time is less than 0, it indicates that the signal strength between the terminal device and the access network device tends to be higher. In this scenario, the aircraft platform transparently transmits the signal between the terminal device and the access network device, and the terminal device determines the transmission parameter based on the signal transparently transmitted from the aircraft platform. Therefore, if the terminal device determines that the signal transparently transmitted by the aircraft platform is strong, the distance between the aircraft platform and the terminal device is small. It can be learned that the distance between the terminal device and the aircraft platform tends to be smaller at the location. Because the aircraft platform moves very fast, it may be considered that when the terminal device determines, based on that the variation of the distance in the unit time is less than 0, that the distance between the terminal device and the aircraft platform tends to be smaller, the aircraft platform may move to a location close to the terminal device very soon. In this case, the transmit power used by the terminal device to access the access network device is small, and the power consumption is low. Therefore, the terminal device accesses the access network device at the location. On the contrary, if the terminal device determines, at a location, that the variation of the distance between the terminal device and the access network device in the unit time is greater than or equal to 0, the transmit power used by the terminal device to access the access network device is large, and the power consumption is high. Therefore, the terminal device does not access the access network device at the location.

For example, it is assumed that the preset condition is that the absolute value of the variation of the distance between the terminal device and the access network device in the unit time is less than or equal to the distance threshold. It is assumed that the UE is located in coverage of the aircraft platform, and a location of the UE at a moment is used as a reference point. According to common knowledge in this field, when the aircraft platform is far from the earth, a moving speed is high. In this case, a distance between the aircraft platform and the reference point changes fast. When the aircraft platform is close to the earth, the moving speed of the aircraft platform is low. In this case, the distance between the aircraft platform and the reference point changes slowly. In other words, when the aircraft platform is far from the UE, the distance between the aircraft platform and the UE changes fast. When the aircraft platform is close to the UE, the distance between the aircraft platform and the UE changes slowly.

Refer to FIG. 5. The communication architecture shown in FIG. 3B is used as an example. In the process in which the gNB moves from the location 1 to the location 3 with the aircraft platform through the location 2, when the gNB moves to the location 2 with the aircraft platform, the UE determines that the absolute value of the variation of the distance in the unit time is less than or equal to the distance threshold in this case. In this case, the preset condition is satisfied, and the UE accesses the gNB. Specifically, that the variation of the distance in the unit time is less than or equal to the channel parameter threshold indicates that the distance between the UE and the gNB on the aircraft platform changes slowly. In other words, the distance between the UE and the aircraft platform is stable. It can be inferred according to the common knowledge that the aircraft platform is close to the UE in this case. In other words, the distance between the UE and the gNB on the aircraft platform is small. When the distance between the UE and the gNB is small, the transmit power required by the UE to access the gNB is small, and the power consumption is low. Therefore, the UE accesses the gNB.

On the contrary, when the gNB moves to the location 1 or the location 3 with the aircraft platform, the UE determines that the absolute value of the variation of the distance in the unit time is greater than the distance threshold in this case. In this case, the preset condition is not satisfied, and the UE does not access the gNB. Specifically, that the variation of the distance in the unit time is greater than the channel parameter threshold indicates that the distance between the UE and the gNB on the aircraft platform changes fast. In other words, the distance between the UE and the aircraft platform is unstable. It can be inferred according to the common knowledge that the aircraft platform is far from the UE in this case. In other words, the distance between the UE and the gNB on the aircraft platform is large. When the distance between the UE and the gNB is large, the transmit power required by the UE to access the gNB is large, and the power consumption is high. Therefore, the UE does not access the gNB.

In another embodiment, the foregoing method may alternatively be applied to the communication architecture shown in FIG. 3A. In the communication architecture, the aircraft platform has the forwarding function. The distance may be a communication distance between the terminal device and the access network device, or may be a communication distance between the terminal device and the aircraft platform. For example, if the terminal device determines, at a location, that the absolute value of the variation of the distance between the terminal device and the access network device in the unit time is less than or equal to the distance threshold, it indicates that the signal strength between the terminal device and the access network device changes slowly. In this scenario, the aircraft platform transparently transmits the signal between the terminal device and the access network device, and the terminal device determines the transmission parameter based on the signal transparently transmitted from the aircraft platform. Therefore, if the terminal device determines that the signal transparently transmitted by the aircraft platform is strong, the distance between the aircraft platform and the terminal device is small. It can be learned that the distance between the terminal device and the aircraft platform changes slowly and is stable at the location. It can be inferred according to the common knowledge that the aircraft platform is close to the terminal device in this case. In this case, the transmit power used by the terminal device to access the access network device is small, and the power consumption is low. Therefore, the terminal device accesses the access network device at the location. On the contrary, if the terminal device determines, at a location, that the absolute value of the variation of the distance between the terminal device and the access network device in the unit time is greater than the distance threshold, the transmit power used by the terminal device to access the access network device is large, and the power consumption is high. Therefore, the terminal device does not access the access network device at the location.

In Solution 3, the terminal device determines, based on the distance, whether to perform access. If the preset condition includes at least one of the following: the distance between the terminal device and the access network device is less than or equal to the distance threshold; the variation of the distance between the terminal device and the access network device in the unit time is less than 0, where the distance threshold is 0; or the absolute value of the variation of the distance between the terminal device and the access network device in the unit time is less than or equal to the distance threshold, it indicates that the distance between the terminal device and the aircraft platform is small. When the distance between the terminal device and the aircraft platform is small, the terminal device accesses the access network device. In this way, power consumption caused because the terminal device needs to use large transmit power to access the access network device when the terminal device is far from the aircraft platform is avoided.

Optionally, the preset condition may include any two or three of the foregoing three preset conditions.

For example, when the preset condition includes a combination of the preset condition (1) and the preset condition (2), the terminal device accesses the access network device when the distance between the terminal device and the access network device is less than or equal to the distance threshold and the variation of the distance between the terminal device and the access network device in the unit time is less than 0. This is because when both the preset condition (1) and the preset condition (2) are satisfied, it indicates that the distance between the terminal device and the aircraft platform is small, and the distance between the terminal device and the aircraft platform tends to be smaller. In this way, when the distance between the terminal device and the aircraft platform is small, the terminal device accesses the access network device, so that the power consumption can be effectively reduced.

In addition, the preset condition may include a combination of the preset condition (1) and the preset condition (3), or may further include a combination of the preset condition (1), the preset condition (2), and the preset condition (3). A combination of the plurality of preset conditions may further prove that the terminal device accesses the access network device only when the terminal device is close to the aircraft platform, so that the power consumption is effectively reduced, and the power consumption caused because the terminal device needs to use large transmit power to access the access network device when the terminal device is far from the aircraft platform is avoided.

In some other embodiments, the transmission parameter may include a plurality of combinations of the channel parameter, the Doppler frequency shift, the distance, or the like between the terminal device and the access network device. Correspondingly, the preset condition may include the plurality of preset conditions in the foregoing solution 1 to the solution 3.

For example, the transmission parameter may include the channel parameter and the Doppler frequency shift. Correspondingly, the preset condition includes: at least one of the preset conditions when the reference information is the channel parameter threshold between the terminal device and the access network device; and the preset condition when the reference information is the Doppler frequency shift threshold. For example, the preset condition may be that the channel parameter between the terminal device and the access network device is greater than or equal to the channel parameter threshold, and the Doppler frequency shift between the terminal device and the access network device is less than 0. That the channel parameter between the terminal device and the access network device is greater than or equal to the channel parameter threshold may indicate that the distance between the terminal device and the aircraft platform is small. That the Doppler frequency shift between the terminal device and the access network device is less than 0 may indicate that the distance between the terminal device and the aircraft platform tends to be smaller. A combination of the two preset conditions can further prove that the terminal device accesses the access network device only when the terminal device is close to the aircraft platform. In this way, the power consumption is effectively reduced, and power consumption caused because the terminal device needs to use large transmit power to access the access network device when the terminal device is far from the aircraft platform is avoided. In addition, the preset condition may alternatively have other combinations, which are not listed one by one herein.

For another example, the reference information may include the channel parameter, the Doppler frequency shift, and the distance. Correspondingly, the preset condition includes: at least one of the preset conditions when the reference information is the channel parameter threshold between the terminal device and the access network device; the preset condition when the reference information is the Doppler frequency shift threshold; and at least one of the preset conditions when the reference information is the distance threshold between the terminal device and the access network device. For example, the preset condition may be that the variation of the channel parameter between the terminal device and the access network device in the unit time is greater than 0, the Doppler frequency shift between the terminal device and the access network device is less than 0, and the distance between the terminal device and the access network device is less than or equal to the distance threshold. The corresponding preset condition may alternatively have other combinations, which are not listed one by one herein.

It may be understood that the transmission parameters may be combined in a plurality of forms. In this embodiment of this application, the transmission parameter needs to include only one or more of the channel parameter, the Doppler frequency shift, or the distance between the terminal device and the access network device. In this embodiment of this application, a combination form of the transmission parameters is not limited.

The combination of the plurality of transmission parameters can further prove that the terminal device accesses the access network device only when the terminal device is close to the aircraft platform. In this way, the power consumption is effectively reduced, and power consumption caused because the terminal device needs to use large transmit power to access the access network device when the terminal device is far from the aircraft platform is avoided.

404b: When determining, based on the transmission parameter and the reference information, that the preset condition is not satisfied, the terminal device periodically performs steps 402 and 403.

Specifically, that the terminal device does not access the access network device when determining that the preset condition is not satisfied includes at least one of the following: The terminal device determines that the terminal device cannot send the random access preamble to the access network device; the terminal device determines that the terminal device cannot initiate the random access procedure to the access network device; the terminal device determines that the terminal device cannot send the uplink transmission to the access network device; and the access stratum of the terminal device indicates, to the non-access stratum, that the uplink transmission cannot be performed.

A periodicity may be configured by the access network device. For example, the periodicity may be carried in a system message delivered by the access network device to the terminal device. Alternatively, the periodicity may be agreed on in a protocol. A manner of obtaining the periodicity is not limited in this embodiment of this application.

According to the access method in this embodiment of this application, when the distance between the terminal device and the aircraft platform is large, because large transmit power is required for communication, the terminal device does not access the access network device. The terminal device accesses the access network device only when the terminal device detects that the distance between the terminal device and the aircraft platform is small and a preset condition in the access method in this application is satisfied. In this way, the terminal device accesses the access network device only when the terminal device is close to the aircraft platform, to avoid power consumption caused because the terminal device needs to use large transmit power to access the access network device when the terminal device is far from the aircraft platform.

Optionally, the transmission parameter may further include an uplink data volume. When the transmission parameter further includes the uplink data volume, an embodiment of this application may further provide an access method that triggers the data volume. The following describes the access method in detail with reference to FIG. 6. In the access method:

Step 402 may be replaced with the following step.

402a: The terminal device obtains the transmission parameter between the terminal device and the access network device. The transmission parameter includes the uplink data volume and one or more of the channel parameter between the terminal device and the access network device, the Doppler frequency shift between the terminal device and the access network device, or the distance between the terminal device and the access network device.

In this embodiment of the access method, in step 403, when the terminal device determines, based on the transmission parameter and the reference information, whether the terminal device can access the access network device, the reference information may further include a data volume threshold corresponding to the uplink data volume. Correspondingly, the preset condition further includes: The uplink data volume of the terminal device is less than or equal to the data volume threshold.

When the access method in this embodiment is specifically executed, the foregoing step 403 may be replaced with:

501: The terminal device determines whether the uplink data volume is less than or equal to the data volume threshold.

An occasion for sending the data volume threshold is not specially limited. For example, the data volume threshold may be used as the reference information, and is sent with the other reference information (for example, at least one of the channel parameter threshold between the terminal device and the access network device, the Doppler frequency shift threshold between the terminal device and the access network device, or the distance threshold between the terminal device and the access network device) sent by the access network device to the terminal device. Alternatively, the data volume threshold may be sent separately from the other reference information.

502a: When determining that the uplink data volume is less than or equal to the data volume threshold, the terminal device performs at least one of the solution 1, the solution 2, or the solution 3 in step 404a or performs step 404b.

Specifically, when the terminal device determines that the uplink data volume is less than or equal to the data volume threshold, it indicates that the uplink data volume of the terminal device is small. When the uplink data volume of the terminal device is small, a time required for transmitting the data volume is short. It is assumed that when the terminal device starts to transmit data, the terminal device selects to access an aircraft platform close to the terminal device. When the time of transmitting the data volume is short, it may be considered that the aircraft platform is still close to the terminal device, and the terminal device does not change the aircraft platform. Therefore, there is no additional power consumption and complexity caused by changing the aircraft platform in a transmission process.

In this case, to reduce the power consumption, the terminal device needs to access the access network device when the terminal device is close to the aircraft platform. Therefore, when the uplink data volume of the terminal device is less than or equal to the data volume threshold, the terminal device performs at least one of the solution 1, the solution 2, or the solution 3 in step 404a based on a type of the obtained transmission parameter. In other words, it is determined, with reference to the other reference information (for example, the channel parameter threshold between the terminal device and the access network device, the Doppler frequency shift threshold between the terminal device and the access network device, or the distance threshold between the terminal device and the access network device), that the terminal device accesses the access network device only when the terminal device is close to the aircraft platform, to avoid power consumption caused because the terminal device needs to use large transmit power to access the access network device when the terminal device is far from the aircraft platform.

502b: When determining that the uplink data volume is greater than the data volume threshold, the terminal device accesses the access network device.

Specifically, when the uplink data volume of the terminal device is greater than the data volume threshold, in other words, when the uplink data volume of the terminal device is large, transmission time required for transmitting the large data volume is long. It is assumed that when the terminal device starts to transmit data, the terminal device selects to access an aircraft platform close to the terminal device. However, because the aircraft platform moves, in long transmission time, the close aircraft platform may move to a far location, and the aircraft platform may be changed. In this case, the transmit power required by the terminal device to access the access network device increases, and the power consumption increases. It can be learned that when the data volume is large and the transmission time is long, the terminal device waits for access until the terminal device is close to the aircraft platform. This does not necessarily effectively reduce the power consumption, but increases a service delay.

Therefore, when the data volume is large, the terminal device does not need to access the access network device until the terminal device is close to the aircraft platform. To avoid extra power consumption, complexity, and even a data loss problem caused by changing the aircraft platform in the transmission process, and to ensure service timeliness to some extent, the terminal device directly accesses the access network device.

For example, it is assumed that the access network device is carried on the aircraft platform, and when the access network device moves to a location with the aircraft platform, the terminal device obtains an uplink data volume and a distance between the terminal device and the access network device. In this case, if the terminal device determines that the uplink data volume is less than the data volume threshold, the terminal device determines, based on the distance between the terminal device and the access network device and the distance threshold, whether the terminal device can access the access network device. Specifically, the terminal device determines whether one or more of the preset conditions when the transmission parameter is the distance between the terminal device and the access network device are satisfied. If determining, based on the distance and the distance threshold, that the preset condition is satisfied, the terminal device accesses the access network device. If determining, based on the distance and the distance threshold, that the preset condition is not satisfied, the terminal device periodically determines, based on the distance and the distance threshold, whether the preset condition is satisfied. In another embodiment, if the terminal device determines that the uplink data volume is greater than the data volume threshold, the terminal device directly accesses the access network device.

According to the foregoing method, when the uplink data volume of the terminal device is small, the terminal device accesses the access network device when the terminal device is close to the aircraft platform. This avoids power consumption caused because the terminal device needs to use large transmit power to access the access network device when the terminal device is far from the aircraft platform. When the uplink data volume of the terminal device is large, the terminal device directly accesses the access network device, to avoid power consumption and complexity caused by changing the aircraft platform in a transmission process.

The foregoing mainly describes the solutions provided in embodiments of this application from a perspective of interaction between communication apparatuses. It may be understood that to implement the foregoing functions, the terminal device or the access network device includes corresponding hardware structures and/or software modules for performing the functions. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the communication apparatus may be divided into function modules based on the foregoing method examples. For example, each function module may be obtained through division based on each function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

The foregoing mainly describes the methods in embodiments of this application. The following describes a communication apparatus that is provided in embodiments of this application and that performs the foregoing method. A person skilled in the art may understand that a method and an apparatus may be mutually combined and referenced. A communication apparatus provided in embodiments of this application may perform the steps performed by the terminal device in the foregoing access methods.

Figure 7:
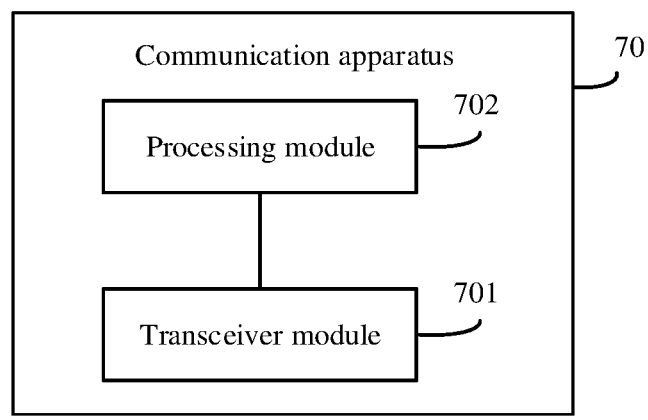
FIG. 7 is a schematic diagram of a structure of a communication apparatus according to an embodiment of this application.

For example, when each functional module is obtained through division in an integrated manner, FIG. 7 is a schematic diagram of a structure of a communication apparatus 70. The communication apparatus 70 includes a transceiver module 701 and a processing module 702.

In some embodiments, the communication apparatus 70 is a terminal device or is disposed on a terminal device. The transceiver module 701 may be configured to support the communication apparatus 70 in performing step 401 and step 402 shown in FIG. 4 in the foregoing embodiment, step 401 and step 402a shown in FIG. 6, and/or other steps or functions performed by the terminal device in the foregoing method embodiments, to obtain the transmission parameter between the communication apparatus and the access network device; and obtain the first capability indication information or the second capability indication information from the access network device.

Figure 6:
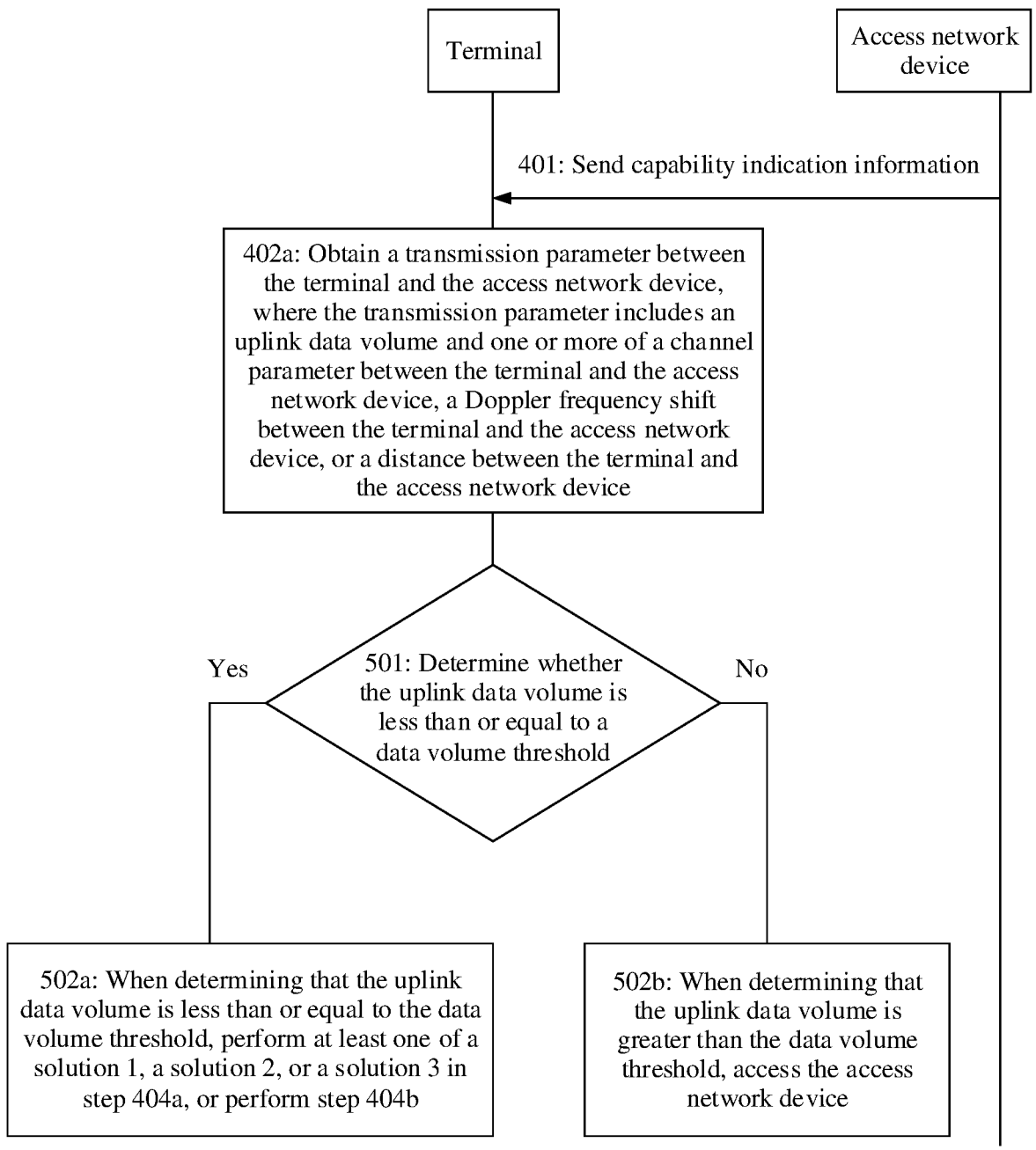
FIG. 6 is a schematic diagram of another access method according to an embodiment of this application.

The processing module 702 is configured to support the communication apparatus 70 in performing step 403, step 404a, and step 404b shown in FIG. 4 in the foregoing embodiment, steps 501, 502a, and 502b shown in FIG. 6, and/or other steps or functions performed by the terminal device in the foregoing method embodiments, Therefore, the communication apparatus 70 is enabled to access the access network device in a proper scenario.

In some other embodiments, the communication apparatus 70 is an access network device or is disposed on an access network device. The processing module 702 is configured to send capability indication information to a terminal device by using the transceiver module 701. The capability indication information includes first capability indication information or second indication information. The first capability indication information indicates the terminal device to access the communication apparatus based on a transmission parameter and reference information. The second capability indication information indicates the terminal device to access the communication apparatus based on the transmission parameter and the reference information when the terminal device performs a first service. The transceiver module 701 and the processing module 702 are further configured to support the communication apparatus 70 in performing other steps or functions performed by the access network device in the foregoing method embodiments.

All related content of the steps in the foregoing method embodiments may be cited in function descriptions of the corresponding functional modules. Details are not described herein again.

In this embodiment of this application, the communication apparatus 70 is presented in a form of functional modules obtained through division in an integrated manner. The module herein may be an ASIC, a circuit, a processor that executes one or more software or firmware programs, a memory, an integrated logic circuit, and/or another component capable of providing the foregoing functions. In a simple embodiment, a person skilled in the art may figure out that the communication apparatus 70 may be in the form shown in FIG. 2.

For example, the processor 201 in FIG. 2 may invoke the computer instructions stored in the memory 203, to enable the communication apparatus 70 to perform the actions performed by the terminal device in the foregoing method embodiments.

Specifically, functions/implementation processes of the transceiver module 701 and the processing module 702 in FIG. 7 may be implemented by the processor 201 in FIG. 2 invoking the computer instructions stored in the memory 203. Alternatively, the functions/implementation processes of the transceiver module 701 in FIG. 7 may be implemented by the communication interface 204 in FIG. 2, and the functions/implementation processes of the processing module 702 in FIG. 7 may be implemented by the processor 201 in FIG. 2 by invoking the computer instructions stored in the memory 203.

The memory 203 may be configured to store related instructions and data. For example, when the communication apparatus is the terminal device or is disposed on the terminal device, the memory 203 may be further configured to store the reference information for determining whether the access network device can be accessed.

Optionally, an embodiment of this application further provides a computer-readable storage medium. The computer-readable storage medium stores computer instructions. When the computer instructions are run on a communication apparatus, the communication apparatus is enabled to perform the foregoing related method steps to implement the access method in the foregoing embodiment. For example, the communication apparatus may be the terminal device in the foregoing method embodiments. Alternatively, the communication apparatus may be the access network device in the foregoing method embodiments.

Optionally, an embodiment of this application further provides a computer program product. When the computer program product runs on a computer, the computer is enabled to perform the foregoing related steps to implement the access method performed by the communication apparatus in the foregoing embodiment. For example, the communication apparatus may be the terminal device in the foregoing method embodiments. Alternatively, the communication apparatus may be the access network device in the foregoing method embodiments.

Optionally, an embodiment of this application further provides an apparatus. The apparatus may be specifically a chip, a component, a module, or a system-on-a-chip. The apparatus may include a processor and a memory that are connected to each other. The memory is configured to store computer instructions. When the apparatus runs, the processor may execute the computer instructions stored in the memory, to enable the chip to perform the access method performed by the communication apparatus in the foregoing method embodiment. For example, the communication apparatus may be the terminal device in the foregoing method embodiments. Alternatively, the communication apparatus may be the access network device in the foregoing method embodiments.

Optionally, an embodiment of this application further provides a communication system. The communication system includes a terminal device and an access network device. The terminal device and the access network device in the communication system may respectively perform the access methods performed by the terminal device and the access network device in the foregoing embodiments.

The communication apparatus, the computer-readable storage medium, the computer program product, the chip, or the system-on-a-chip provided in embodiments of this application is configured to perform the corresponding method provided above. Therefore, for beneficial effects that can be achieved by the apparatus, the computer-readable storage medium, the computer program product, or the chip, refer to beneficial effects in the corresponding method provided above. Details are not described herein again.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD for short)), or the like.

Although this application is described with reference to embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the spirit and scope of this application. Correspondingly, the specification and accompanying drawings are merely example description of this application defined by the appended claims, and are considered as any of or all modifications, variations, combinations or equivalents that cover the scope of this application. It is clearly that a person skilled in the art can make various modifications and variations to this application without departing from the spirit and scope of this application. In this way, this application is intended to cover these modifications and variations of this application provided that they fall within the scope of the claims of this application and their equivalent technologies.

What is claimed is:
1. A method, comprising:
receiving first capability indication information or second capability indication information from an access network device, wherein the first capability indication information indicates to a terminal device to determine whether to access the access network device based on a transmission parameter and reference information, and the second capability indication information indicates to the terminal device to determine whether to access the access network device based on the trans- mission parameter and the reference information when the terminal device performs a first service;

obtaining the transmission parameter, wherein the transmission parameter is configured to be used in a transmission between the terminal device and the access network device; and accessing the access network device when determining, based on the transmission parameter and the reference information, that a preset condition is satisfied, wherein the reference information comprises a threshold corresponding to the transmission parameter.

2. The method according to claim 1, wherein the reference information comprises one or more of a channel parameter threshold, a Doppler frequency shift threshold, or a distance threshold of a distance between the terminal device and the access network device.

3. The method according to claim 2, wherein the transmission parameter comprises a channel parameter, and the preset condition comprises:
the channel parameter is greater than or equal to the channel parameter threshold; or
an absolute value of a variation of the channel parameter in a unit of time is less than or equal to the channel parameter threshold.

4. The method according to claim 2, wherein the transmission parameter comprises a channel parameter, the channel parameter threshold is 0, and the preset condition comprises:
a variation of the channel parameter in a unit of time is greater than 0.

5. The method according to claim 2, wherein the transmission parameter comprises a Doppler frequency shift, the Doppler frequency shift threshold is 0, and the preset condition comprises:
the Doppler frequency shift is less than 0.

6. The method according to claim 2, wherein the transmission parameter comprises the distance, and the preset condition comprises:
the distance is less than or equal to the distance threshold; or
a variation of the distance in a unit of time is less than or equal to the distance threshold.

7. The method according to claim 2, wherein the transmission parameter comprises the distance, the distance threshold is 0, and the preset condition comprises:
a variation of the distance is less than 0.

8. The method according to claim 1, further comprising:
when determining, based on the transmission parameter and the reference information, that the preset condition is not satisfied, periodically determining, by the terminal device based on the reference information, whether to access the access network device.

9. The method according to claim 1,
wherein accessing the access network device when determining, based on the transmission parameter and the reference information, that the preset condition is satisfied comprises:
accessing the access network device based on the transmission parameter and the reference information when the preset condition is satisfied and when performing the first service.

10. A method, comprising:
sending capability indication information to a terminal device, wherein the capability indication information comprises first capability indication information or second capability indication information, the first capability indication information indicates to the terminal device to determine whether to access an access network device based on a transmission parameter and reference information, and the second capability indication information indicates to the terminal device to determine whether to access the access network device based on the transmission parameter and the reference information when the terminal device performs a first service; and sending the reference information to the terminal device, wherein the reference information comprises a reference value of the transmission parameter between the access network device and the terminal device.

11. An apparatus, comprising:
a transceiver; and
a processor;
wherein the transceiver is configured to:
receive first capability indication information or second capability indication information from an access network device, wherein the first capability indication information indicates to a terminal device to determine whether to access the access network device based on a transmission parameter and reference information, and the second capability indication information indicates to the terminal device to determine whether to access the access network device based on the transmission parameter and the reference information when the terminal device performs a first service;
obtain the transmission parameter, wherein the transmission parameter is configured to be used in a transmission between the apparatus and the access network device; and
wherein the processor is configured to access the access network device when determining, based on the transmission parameter and the reference information, that a preset condition is satisfied, wherein the reference information comprises a threshold corresponding to the transmission parameter.

12. The apparatus according to claim 11, wherein the reference information comprises one or more of a channel parameter threshold, a Doppler frequency shift threshold, or a distance threshold of a distance between the apparatus and the access network device.

13. The apparatus according to claim 12, wherein the transmission parameter comprises a channel parameter, and the preset condition comprises:
the channel parameter is greater than or equal to the channel parameter threshold; or
an absolute value of a variation of the channel parameter in a unit of time is less than or equal to the channel parameter threshold.

14. The apparatus according to claim 12, wherein the transmission parameter comprises a channel parameter, the channel parameter threshold is 0, and the preset condition comprises:
a variation of the channel parameter in a unit of time is greater than 0.

15. The apparatus according to claim 12, wherein the transmission parameter comprises a Doppler frequency shift, the Doppler frequency shift threshold is 0, and the preset condition comprises:
the Doppler frequency shift is less than 0.

16. The apparatus according to claim 12, wherein the transmission parameter comprises the distance, and the preset condition comprises:
the distance is less than or equal to the distance threshold.

17. The apparatus according to claim 12, wherein the transmission parameter comprises the distance, and the preset condition comprises:

a variation of the distance in a unit of time is less than or equal to the distance threshold.

18. The apparatus according to claim 12, wherein the transmission parameter comprises the distance, the distance threshold is 0, and the preset condition comprises:

a variation of the distance is less than 0.

19. A apparatus, comprising:

a transceiver; and a processor, wherein the processor is configured to:

send capability indication information to a terminal device by using the transceiver, wherein the capability indication information comprises first capability indication information or second capability indication information, the first capability indication information indicates to the terminal device to determine whether to access the apparatus based on a transmission parameter and reference information, and the second capability indication information indicates to the terminal device to determine whether to access the apparatus based on the transmission parameter and the reference information when the terminal device performs a first service; and send the reference information to the terminal device by using the transceiver, wherein the reference information comprises a reference value of the transmission parameter between the apparatus and the terminal device.

20. The apparatus according to claim 19, wherein the reference information comprises one or more of a channel parameter threshold, a Doppler frequency shift threshold, or a distance threshold of a distance between the terminal device and an access network device.

* * * * *